G. S. & P. H. A. BALSLEY.
MACHINE FOR FORMING PLASTIC MATERIAL.
APPLICATION FILED NOV. 25, 1907.
942,238.
Patented Dec. 7, 1909.
3 SHEETS—SHEET 1.
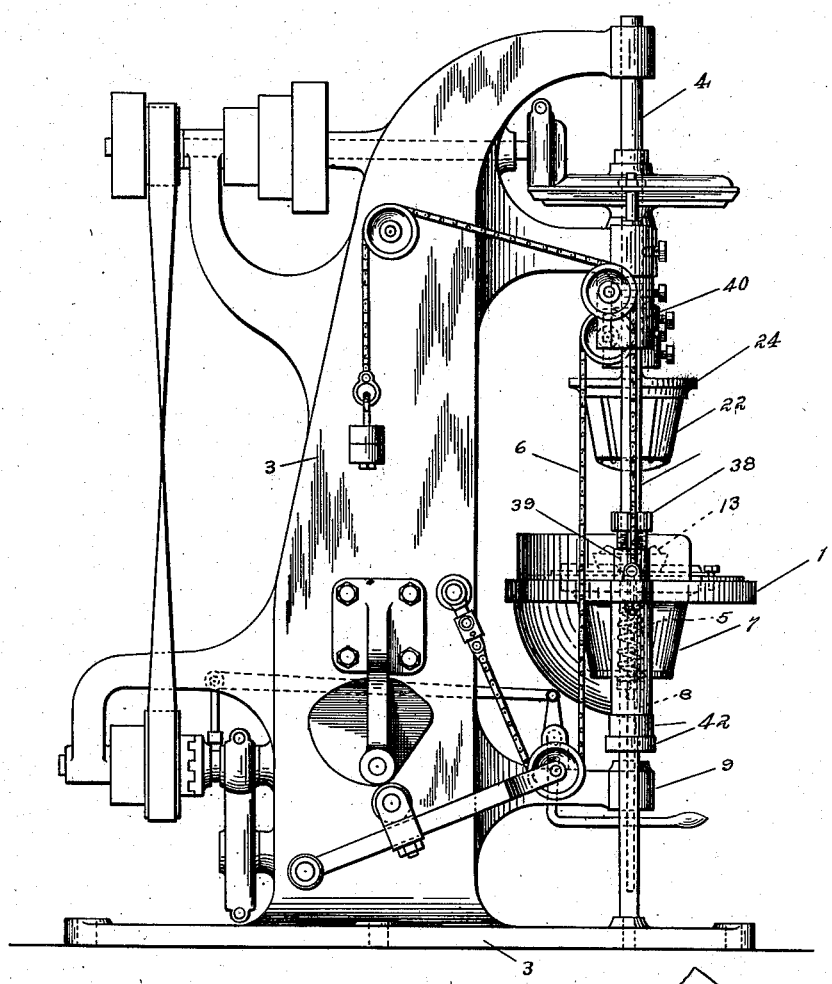
Fig. 1.
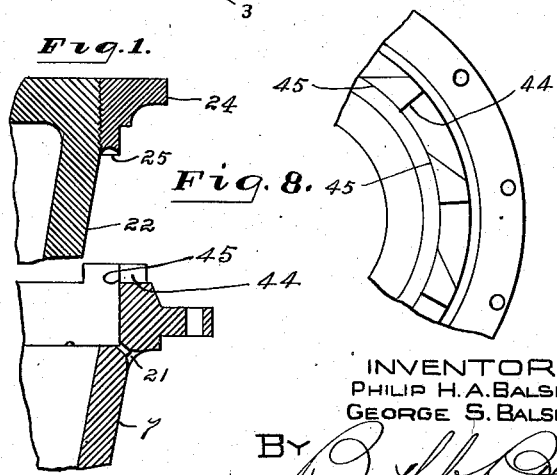
WITNESSES:
Walter A. Greenburg
A. M. Dorr.
INVENTORS:
PHILIP H. A. BALSLEY.
GEORGE S. BALSLEY.
BY
ATTORNEYS.

G. S. & P. H. A. BALSLEY.
MACHINE FOR FORMING PLASTIC MATERIAL.
APPLICATION FILED NOV. 25, 1907.
942,238.
Patented Dec. 7, 1909.
3 SHEETS—SHEET 2.
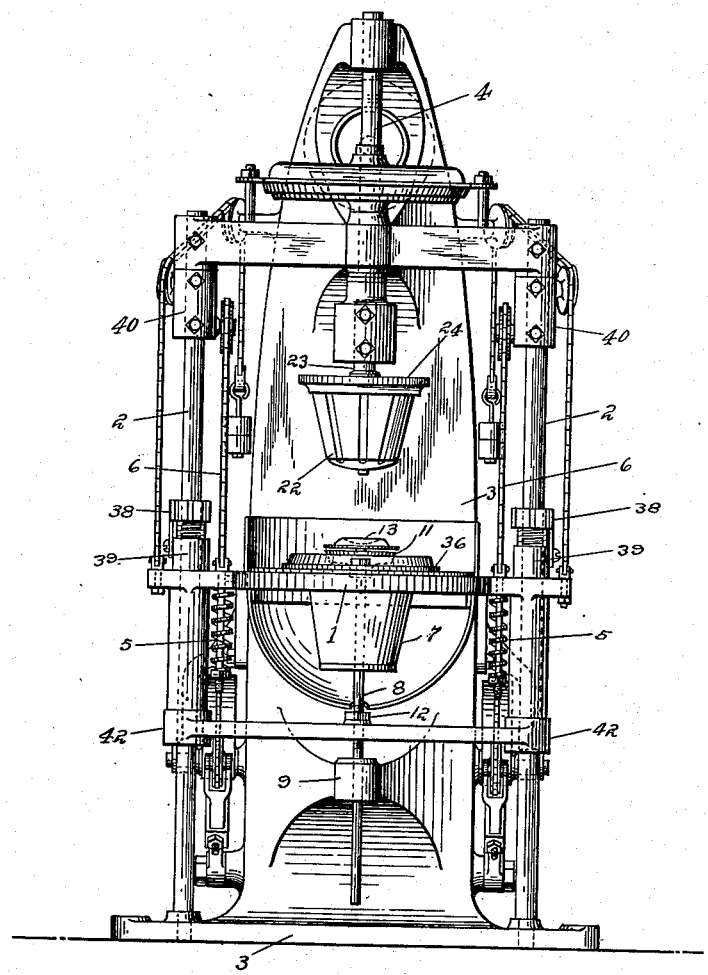
Fig. 2.
WITNESSES:
Walter A. Greenburg
A. M. Dorr.
INVENTORS:
PHILIP H. A. BALSLEY
GEORGE S. BALSLEY
BY 
ATTORNEYS.

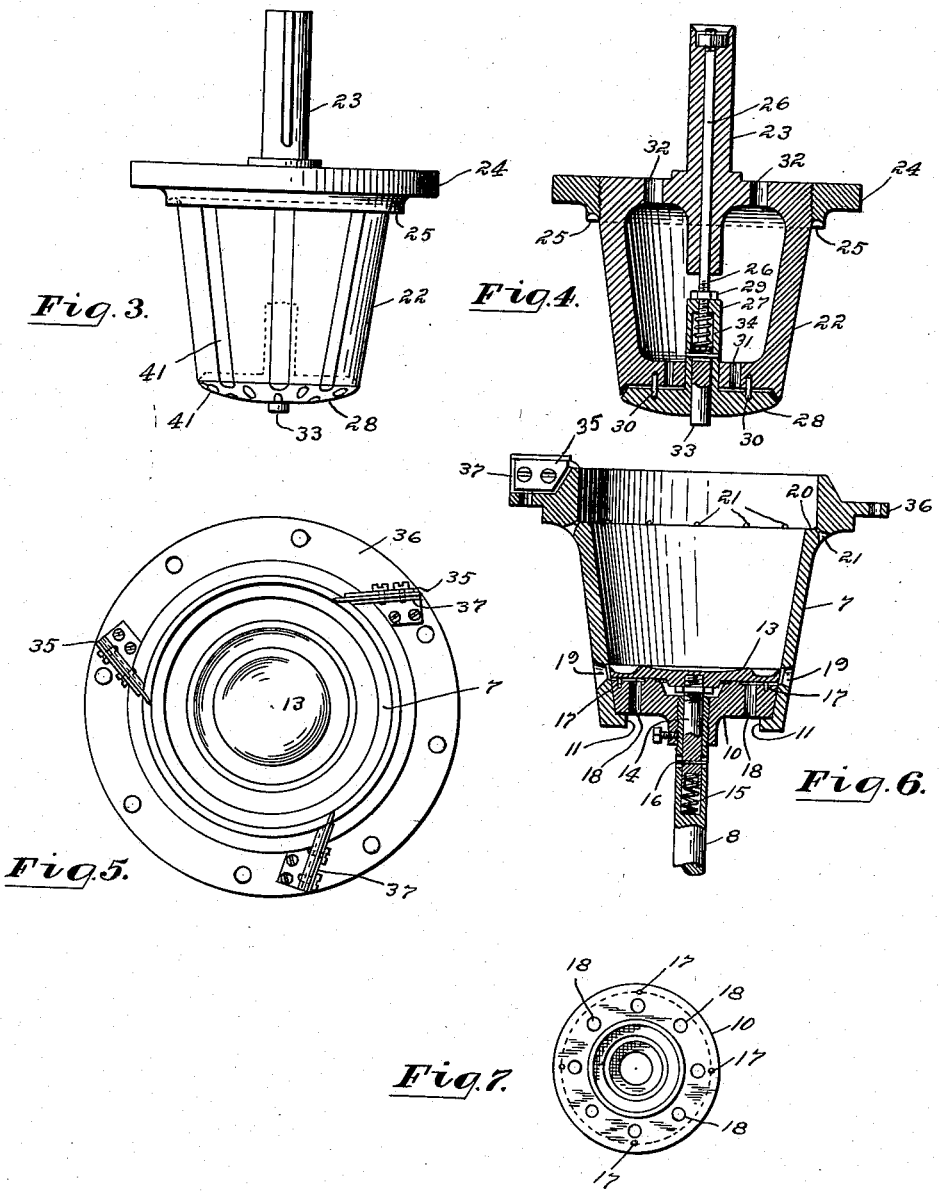

UNITED STATES PATENT OFFICE.

GEORGE S. BALSLEY AND PHILIP H. A. BALSLEY, OF DETROIT, MICHIGAN.

MACHINE FOR FORMING PLASTIC MATERIAL.

942,238.  Specification of Letters Patent.  Patented Dec. 7, 1909.

Application filed November 25, 1907. Serial No. 403,759.

*To all whom it may concern:*

Be it known that we, GEORGE S. BALSLEY and PHILIP H. A. BALSLEY, citizens of the United States of America, residing at Detroit, in the county of Wayne and State of Michigan, have invented certain new and useful Improvements in Machines for Forming Plastic Material, of which the following is a specification, reference being had therein to the accompanying drawings.

This invention relates to a machine for manufacturing vessels of plastic material, such as clay, papier mâché and the like, and especially to means for positively working the vessels to form, in such manner that the blow holes, rough surfaces and irregularities in the grain or body of the vessel common to articles of this stamp that are molded or pressed in the ordinary manner, are avoided.

The invention consists in the matters hereinafter set forth, and more particularly pointed out in the appended claims.

Referring to the drawings, Figure 1 is a view in side elevation of a machine embodying features of the invention. Fig. 2 is a view in front elevation of the machine. Fig. 3 is a view in detail, in elevation, of a spinner. Fig. 4 is a view in longitudinal section of the spinner. Fig. 5 is a plan view in detail of a mold. Fig. 6 is a view in longitudinal section of the mold. Fig. 7 is a plan view of a foot plate. Fig. 8 is a view in detail of a modified form of mold.

In its general features, the machine consists of a horizontal platen 1 reciprocable on vertical ways or guide rods 2 of a main frame 3 of appropriate design beneath a vertical rotatable spindle 4, the driving mechanism of the platen and spindle being of any approved form, as for example the conventional means indicated. Springs 5 are, however, interposed between the platen and the members of the operating means directly connected thereto, as for instance, lifting chains 6, to afford yielding support for the platen.

A mold 7 whose interior corresponds in contour to the exterior of the vessel to be formed, is inset in an aperture in the platen in axial alinement with the spindle 4. A stem 8 which is reciprocable in axial alinement with the spindle in guide apertures in a bracket 9 of the frame and a cross brace connecting the guide rods 2 extends through the open mold and a circular base 10 secured on its upper end is adapted to seat itself on an inner annular flange 11 at the lower end of the mold as the latter rises, and acts as an ejector when the mold falls, an adjustable collar 12 on the stem acting as a stop to check its downward movement.

A bottom plate 13 is adjustably secured on the upper end of a rod 14 longitudinally reciprocable in the stem 8 against a spring 15. A transverse key or pin 16 in the rod engaging longitudinal slots in the stem prevents rotation. The plate when depressed, is held at an interval above the base by studs 17. Air ducts 18 through the base 10 communicate with the space between the plate and base, and apertures 19 are so disposed in the mold as to span the margin of the plate and open simultaneously into the mold interior and into the space. If there be any shoulders or fillets forming corners 20 in the mold, a plurality of air vents 21 lead therefrom through the mold wall.

A former having a hollow body 22 corresponding in general contour to the interior of the article to be formed is removably secured as by an axial stem 23 in the lower end of the spindle 4, so as to register properly with the mold. A collar 24 is screw-threaded on or otherwise adjustably secured on the body, and has an under face 25 grooved or otherwise suitably shaped to form up the lip or margin of the vessel to be molded. A rod 26 longitudinally reciprocable in an axial aperture in the stem 23, is adjustably screw-threaded at its lower end into the hub 27 of a foot plate 28, a nut 29 limiting the movement of the rod. The foot plate is seated in the counterbored bottom of the former body 22, dowel pins 30 preventing its rotation. Air vents 31 in the bottom of the body and similar ducts 32 in the top admit air behind the foot plate and allow it to fall away freely from its seat when not in contact with the article to be molded.

When the bottom of the article to be formed is apertured, as for instance, in the manufacture of flower-pots, for which the mold and former herein shown are especially adapted, a plunger 33 is secured in the hub 27 of the foot plate, a spring 34 keeping it projected and the inner end of the rod 26 forming a convenient adjustable stop.

A set of stripping knives 35 are secured on a flange 36 by suitable clips 37 in oblique position to remove the surplus clay or other material thrown out from the mold.

A pair of collars 38 embracing the guide rods are secured on the upper ends of platen sleeves 39 by any preferred means affording accurate adjustment longitudinally of the sleeve, and limit the upper stroke of the platen by contacting with stops 40 on the gibs or rods 2. These are so adjusted that when the mold is raised until the former is at the proper distance from the mold, as evidenced by the relative position of the collar face 24 and the top of the mold, the stops arrest the platen before the lifting members have completed their upstroke. Facets or flat spots or grooves 41 are formed in the former. Or the upper face of the mold 7 may be rabbeted slightly to close by or telescope with the lower end of the collar 24, and a series of knife blocks 44 are either formed integrally thereon or else properly secured in place with their inner faces 45 substantially flush with the mold interior periphery and their vertical forward edges beveled back and sharpened so as to shear away all excess of clay or the like and form the rim without a pin.

In operation, a ball or cylinder of the plastic matter is placed on the base and the mold forced up, picking up the base and closing over the spinner. As the latter encounters the clay, or like matter, the facets or flat spots on the former sweep the clay around the mold, the air escaping out of the side vents and up through the former, and the material being thoroughly worked out to the face of the mold and smoothed off by rubbing thereon. As the platen is arrested and the springs continue momentarily to hold it up, the air is forced out of the mold and the material cleaves to it, the former wears itself loose and rotates in and smooths the interior of the vessel, and forms the bottom with its aperture if the latter be provided for. As the platen is lowered, the foot plate of the former readily drops of its own weight, the air entering after it and down by the facets on the former body, and allowing the formed article to readily fall away from the former. The free ingress of air through the outer vents allows the spring under the bottom plate to suddenly lift the latter just clear of the mold so that as the base is arrested the article is not disturbed by the dropping away of the mold, and is left intact on the plate in perfect condition for drying and firing.

One feature of the invention is the arrest of the platen during a portion of each stroke when the compression is greatest, a sufficient length of time for the rotating former to clear itself and leave the plastic clinging to the mold, the intermittent reciprocation of the platen being timed to permit this in molds of different shapes and areas by proper adjustment of the platen stops.

Obviously, details of construction may be varied without departing from the spirit of the invention and we do not limit ourselves to any particular form or arrangement of parts.

What we claim as our invention is:—

1. A machine for forming vessels from plastic material comprising a frame, a former rotatably mounted thereon, a platen reciprocable in ways in alinement with the former, a mold thereon adapted to coact with the former, a collar longitudinally adjustable on the former adapted to close the top of the mold, a stop on the ways, a collar longitudinally adjustable on the platen adapted to engage the stop coincident with the closing of the mold by the former collar, means for reciprocating the platen adapted to yieldingly maintain the platen against the stop during a portion of the stroke, and a foot plate on the former, adapted to fall away from the former body when the latter is raised.

2. In a machine for forming vessels from plastic material, a reciprocable mold, a rotatable former adapted to coact therewith, and means adapted to admit air around the inner peripheries of the mold and former when the mold is retracted, consisting of a foot plate movably seated on the lower end of the former whose margin extends to the lower peripheral margin of the former, the former body having air passages extending from the upper end of the former to the rear of the foot plate, a base removably seated in the mold, and a bottom plate supported at an interval above the base, the mold having air vents opening into the mold interior and into the interval between the base and bottom plate.

3. A machine for forming vessels from plastic materials comprising a reciprocable mold, a rotatable former adapted to coact therewith, means adapted to reciprocate the mold, adjusting means adapted to limit the movement of the mold toward the former, yielding supporting members between the mold and reciprocating members adapted to maintain the mold in position against the adjusting means during a portion of the stroke of the reciprocating means, means adapted to admit air around the inner peripheries of the mold and former when the mold is retracted, consisting of a foot plate yieldingly seated on the lower end of the former whose margin extends to the lower peripheral margin of the former, the latter having air passages extending from the upper end to the rear of the foot plate, a base removably seated in the mold, and a bottom plate supported at an interval above the base, adapted to centrally register with air vents through the mold when the mold is raised, that open into the mold interior and into the interval between the base and bottom plate, the thickness of the bottom plate being less than the vertical height of the vents.

4. In a machine for forming vessels from plastic material, a rotatable former having a body provided with a movable yieldingly projected foot plate and air ducts leading from the upper part of the body to the rear of the bottom plate, a mold having a body conforming substantially to the former provided with a base having a bottom plate supported at an interval above it and air ducts through the body walls and base communicating with the interior and with the interval between the plate and base, and means to arrest and support the base when the body recedes from the spinner.

5. In a machine for forming vessels from plastic material, a rotatable former having a body provided with a movable yieldingly projected foot plate seated thereon, and with an air duct leading from the upper part of the body through the plate seat, a reciprocable mold having a hollow body substantially conforming interiorly to the exterior of the former, a perforated movable base adapted to close the lower end of the mold and to be projected thereby toward the former, a bottom plate yieldingly supported at an interval above the base, and air ducts through the body walls each opening into the interior of the mold and into the interval between the base and bottom plate, and a spindle adapted to arrest and support the base when the mold descends.

6. In a machine for forming tapered cylindrical vessels of plastic material, a reciprocable mold having an interiorly tapered body, a base adapted to seat itself in the lower end thereof, a bottom plate supported at an interval above the base, a rotatable tapered former conforming to the mold interior provided with a spring projected foot plate seated on its lower end, a collar adjustably secured on the upper end of the former adapted to closely approach the upper edge of the mold, means to reciprocate the mold, and an adjustable stop adapted to arrest the mold as the collar reaches its position.

7. In a machine for forming tapered cylindrical vessels of plastic material, a reciprocable mold having an interiorly tapered body, a base adapted to seat itself on the lower end thereof, a bottom plate supported at an interval above the base, a rotatable tapered former conforming to the mold interior provided with a spring projected foot plate seated on its lower end, a collar adjustably secured on the upper end of the former adapted to closely approach the upper edge of the mold, stripping knives on the exterior of the mold adapted to coact with the collar to form the vessel rim, means to reciprocate the mold, and an adjustable stop adapted to arrest the mold as the collar reaches its position.

In testimony whereof we affix our signatures in presence of two witnesses.

GEORGE S. BALSLEY.
PHILIP H. A. BALSLEY.

Witnesses:
C. R. STICKNEY,
OTTO F. BARTHEL.